April 16, 1968
R. H. KROEMER, JR
3,378,105
FOOD SERVICE SYSTEM
Filed July 29, 1966
3 Sheets-Sheet 1
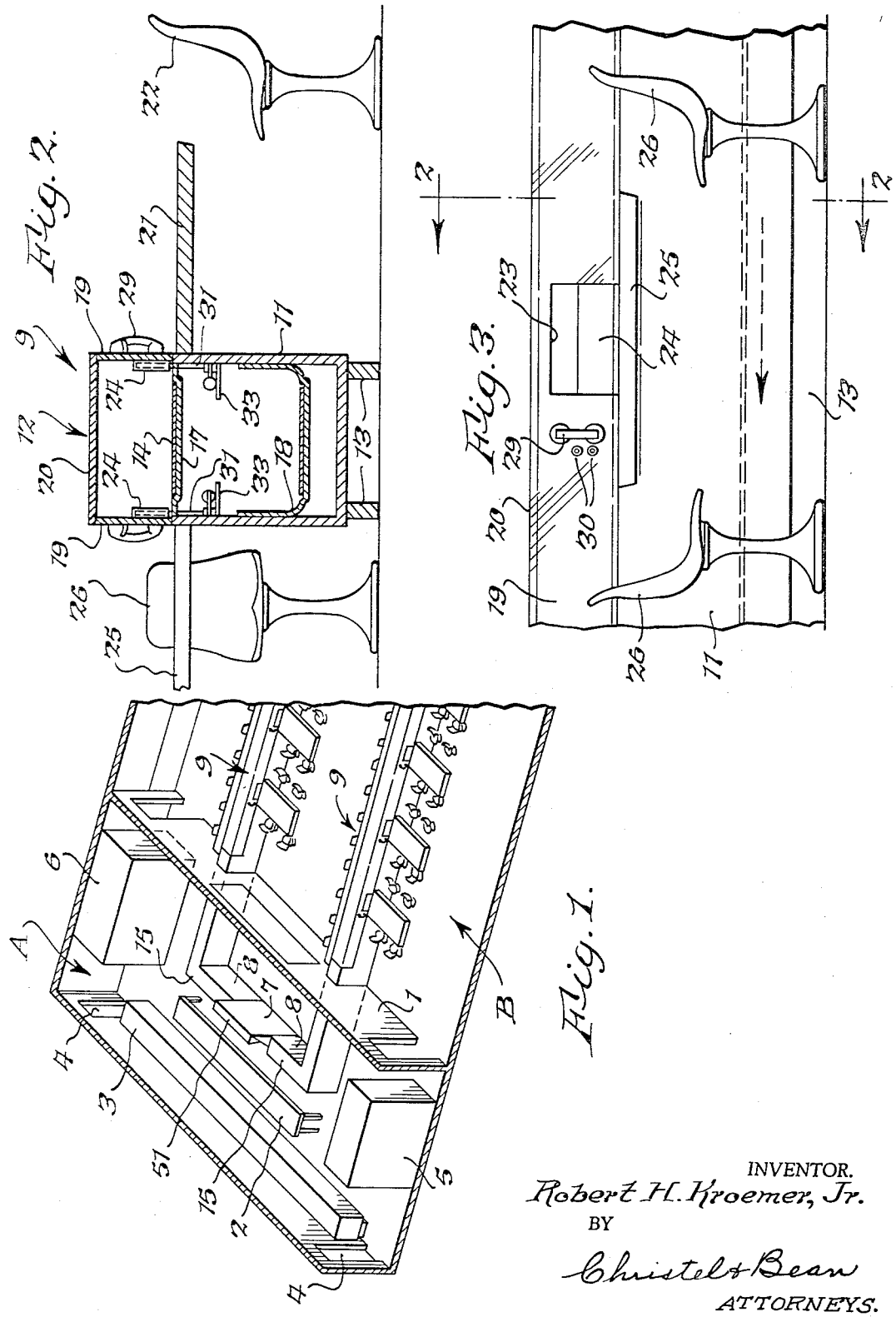
INVENTOR.
Robert H. Kroemer, Jr.
BY
Christel & Bean
ATTORNEYS.

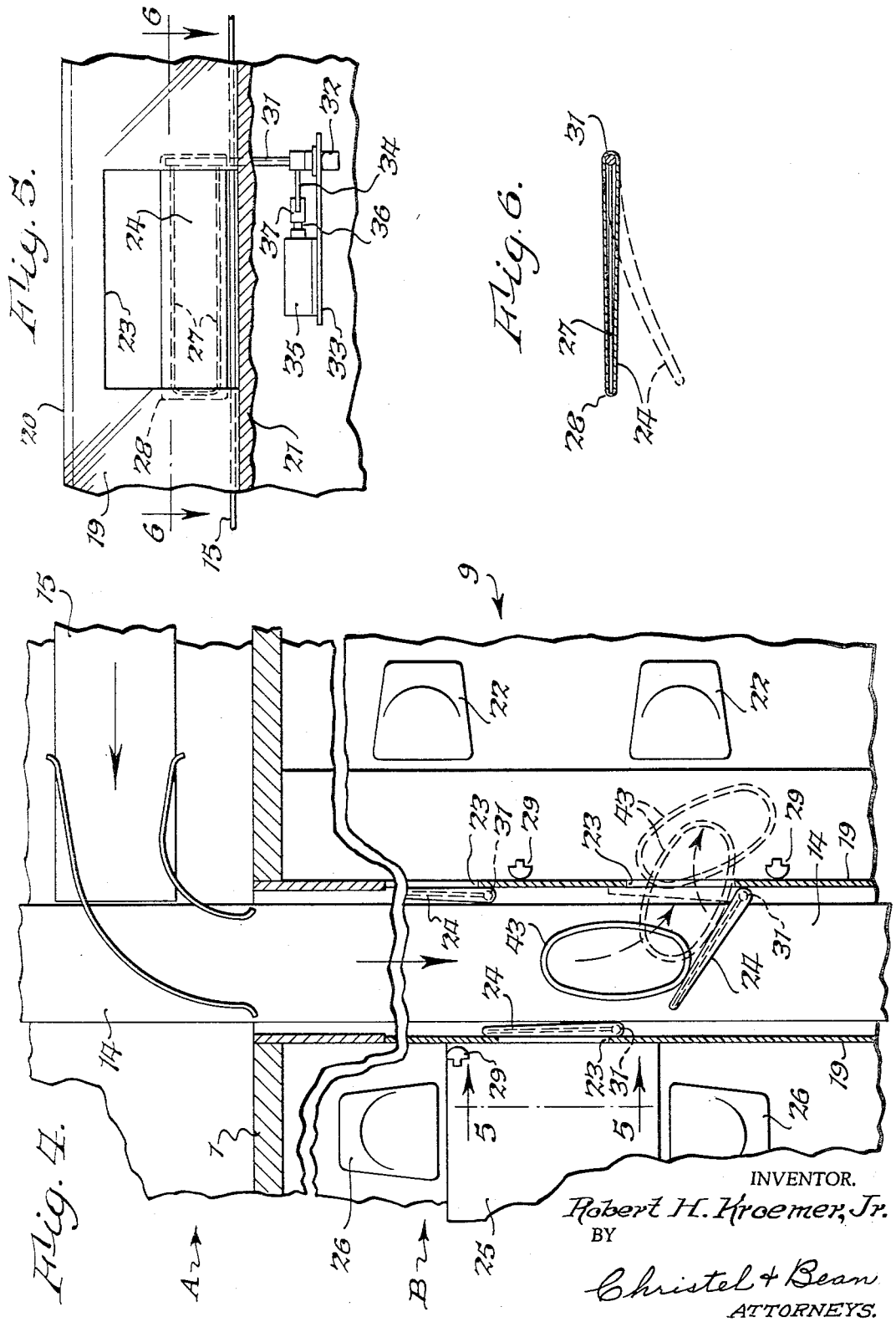

April 16, 1968   R. H. KROEMER, JR   3,378,105
FOOD SERVICE SYSTEM
Filed July 29, 1966   3 Sheets-Sheet 3
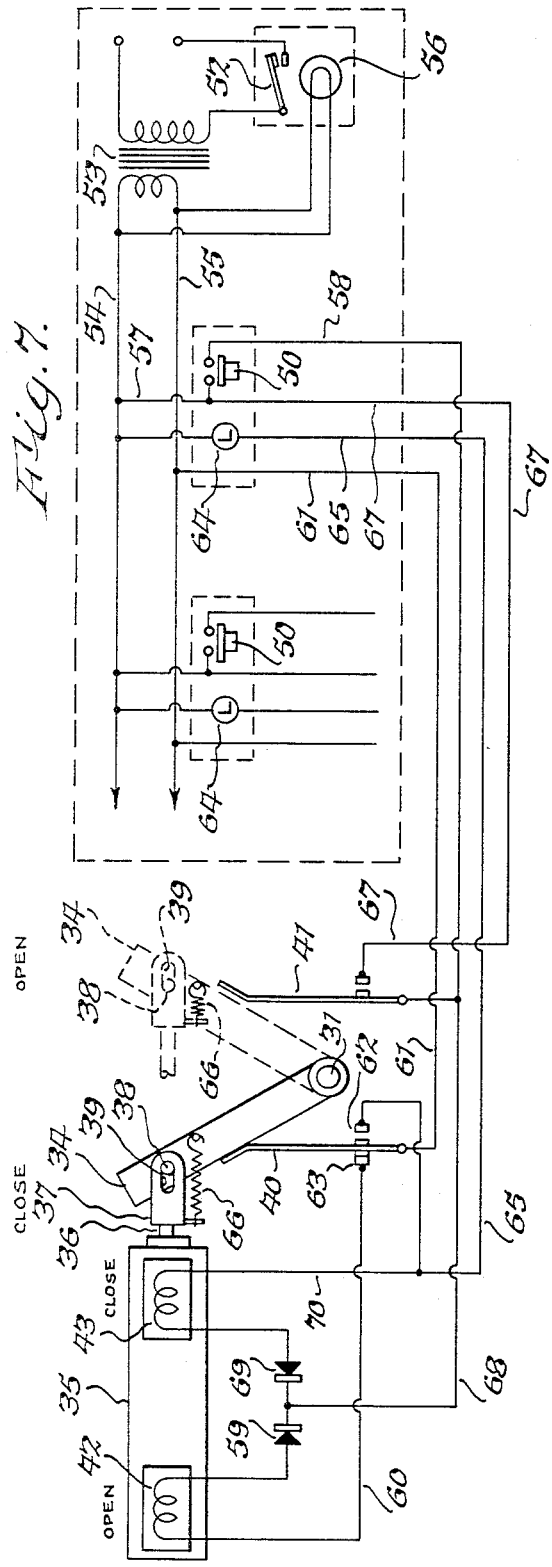
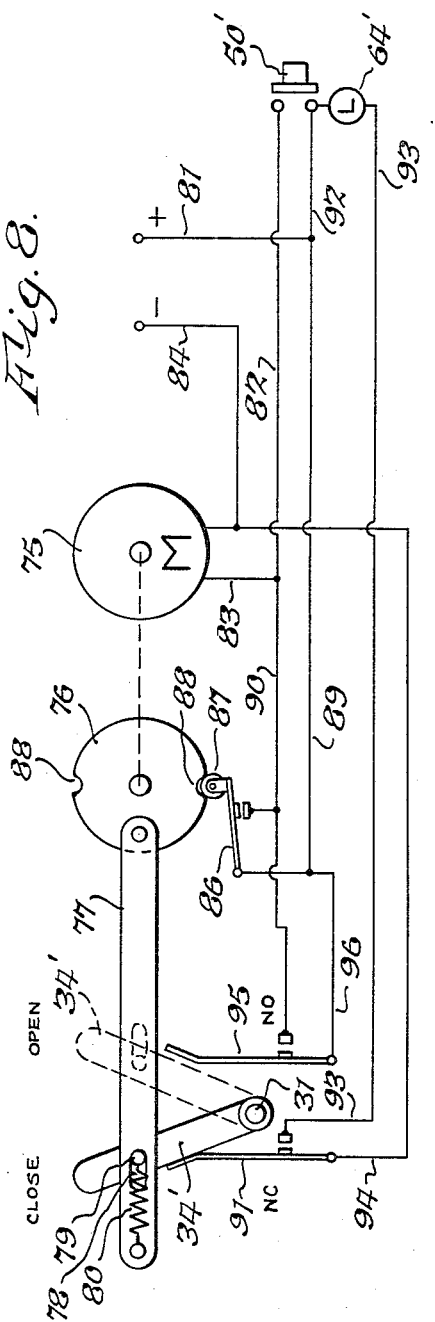
INVENTOR.
Robert H. Kroemer, Jr.
BY
Christel + Bean
ATTORNEYS.

United States Patent Office 3,378,105
Patented Apr. 16, 1968

3,378,105
FOOD SERVICE SYSTEM
Robert H. Kroemer, Jr., 25 Hill Terrace,
Henrietta, N.Y. 14467
Filed July 29, 1966, Ser. No. 568,869
8 Claims. (Cl. 186—1)

ABSTRACT OF THE DISCLOSURE

Dishes are conveyed from a dispatch area to a service area. An interceptor member is moved into intercepting position under dispatcher control. The interceptor member is movable out of that position by a dish engaging thereagainst. Control means responsive to such movement cause the interceptor member to move toward a non-intercepting position during which the interceptor member moves the dish from the conveyor to a table at the service area.

---

This invention relates to a new and useful food service system for restaurants and the like.

In my co-pending application Ser. No. 424,229 filed Jan. 8, 1965, now Patent 3,263,776 dated Aug. 2, 1966, I have disclosed a food service system comprising a conveyor for conveying dishes of food from a food dispatch area to a service area together with transfer means for moving the food dishes from the conveyor to a table in the service area. The transfer means there disclosed includes an intercept member movable into and out of dish intercepting position relative to the conveyor, drive control means operable from the dispatch area to move the intercept member from a non-intercepting position to an intercepting position, and drive control means operable to move the intercept member from intercepting position back to its non-intercepting position in response to engagement by a dish, the latter being moved from the conveyor onto the table by the intercept member during such movement.

It is highly desirable that the dishes of food or trays carrying the same be moved from the conveyor to the serving table in a smooth continuous motion. Abruptly slowing or stopping and abruptly jarring or changing the direction of the dish while it is on the conveyor can cause the food to spill. This is unsightly, and service must be interrupted to stop and clean the conveyor. While the apparatus disclosed in my co-pending application functions satisfactorily in this respect, I have found that the transfer means can be improved.

Accordingly, a primary object of this invention is to provide a food service system of this type with improved means for transferring a food dish from the conveyor to the service table.

It is another object of my invention to provide a food service system having the foregoing characteristics wherein the dish intercept member smoothly and evenly decelerates the dish on the conveyor upon engagement with the interceptor member and then transfers it from the conveyor.

In one aspect thereof, a food service system constructed in accordance with my invention is characterized by the provision of a conveyor extending from a food dispatch area to a customer service area for conveying dishes of food from the former to the latter, and means for transferring the food dishes from the conveyor to a table at the service area, the transfer means including an interceptor member mounted for movement between a dish intercepting position and a non-intercepting position relative to the conveyor, drive means for moving the interceptor member, first drive control means adapted to be actuated from the dispatch area for moving the interceptor member into dish intercepting position, the interceptor member being movable out of dish intercepting position by a dish engaging thereagainst, and a second drive control means responsive to said latter movement for moving the itnerceptor member toward non-intercepting position, the interceptor member moving the intercepted dish from the conveyor onto the table during its movement toward the non-intercepting position.

The foregoing and various other novel features of construction and advantages inherent in the food service system of the present invention are pointed out in detail in conjunction with the following description of two illustrative embodiments thereof as depicted in the accompanying drawings wherein like reference numerals denote like parts throughout the various views and wherein:

FIG. 1 is a fragmentary perspective view of the interior of a restaurant incorporating the food service system of my invention;

FIG. 2 is a fragmentary transverse sectional view through one of the customer service station groups thereof taken about on line 2—2 of FIG. 3;

FIG. 3 is a fragmentary side elevational view of a customer service station grouping;

FIG. 4 is a fragmentary view, partly in plan and partly in horizontal section of a set of dispatch and service conveyors, parts being broken away for ease of illustration and to indicate indefinite length;

FIG. 5 is a fragmentary detail view, partly in section and partly in side elevation, on an enlarged scale, showing an interceptor member in closed position and the actuating means therefor, being taken about on line 5—5 of FIG. 4;

FIG. 6 is a horizontal sectional view of an interceptor member, parts being omitted and being taken about on line 6—6 of FIG. 5, indicating in broken lines the resilient yielding movement of the intercept member after engagement by a dish;

FIG. 7 is a schematic wiring diagram of an interceptor member drive control system; and FIG. 8 is a schematic wiring diagram of another form of interceptor drive control system.

Referring now in detail to the illustrative embodiment depicted in the accompanying drawings, there is shown in FIG. 1 a restaurant divided by a wall 1 into a work area A and a customer service area B. In work area A there can be a table 2 for assembling food orders, the individual food items being selected from a table 3 which can comprise a pair of conveyors moving inwardly toward the center from doorways 4 leading for example to a kitchen area. Refrigeration and storage units can be provided, as indicated at 5, and lockers, washrooms or the like can be provided at 6. A dispatch station is indicated at 7, and transfer conveyors indicated at 8 are provided for delivery of food dishes from dispatch station 7 to a pair of customer service station groupings generally designated 9 extending from wall 1 into customer service area B.

Referring now to FIGS. 2 and 3, each customer service station grouping 9 includes an elongated base 11 extending into area B from wall 1 and surmounted by an inverted generally U-shaped enclosure 12 which can be transparent but need not be. Base 11 can be of any desired construction containing, for example, access panels and other details not shown, and is mounted on the floor or other supporting surface by an inset supporting base 13. An endless belt conveyor 14 extends from work area A through wall 1 the length of each station grouping 9, being supported at one end by a drive roll and at its opposite end by an idler roll of known construction and in a manner known in the art and therefore not shown. Endless belts 15 in work area A have their upper conveying flights moving in opposite directions away from dispatch station 7 toward conveyors 14 at the respective station groups 9.

The upper conveying flights of belts 14 are supported by plates 17 extending across the upper end of each base 11, which plates are recessed to receive the belt in flush relation with the edges of the plate. The return flights of the conveyor belts 14 are supported by plates 18 extending across bases 11 adjacent the lower ends thereof. Enclosures 12 comprise opposite walls 19 and a top wall 20 preferably of Plexiglas or other transparent material enabling the customers to see through the enclosures to the conveyors and to the food dishes being conveyed thereby.

In the illustrated embodiment, a counter 21 is provided at one side of each station grouping 9, extending the full length thereof, and individual chairs 22 are provided at spaced points therealong in the manner of counter stools. The adjacent enclosure wall 19 is provided with a series of service ports or openings 23 therethrough, directly in front of each chair 22, which openings are normally closed by interceptor door members 24. A series of tables 25 is provided on the opposite side of each station grouping 9, the tables being located at spaced points therealong with chairs 26 arranged on opposite sides of each table. Similar service ports or openings 23 are provided through the adjacent enclosure side 19 at each table 25, which ports are likewise normally closed by interceptor door members 24. The term table is used herein and in the claims in a broad sense, to include counters and other means providing a table surface.

Each door member 24 comprises a U-shaped resilient rod 27 (FIG. 5) which extends across the associated opening 23 with the lateral ends thereof secured to a vertical shaft 31. A plastic boot 28 is releasably secured to rod 27 and encases the same.

A telephone 29 is provided adjacent each individual service area or station, beside each service opening 23 for calling in an order to the dispatcher at station 7. Signal lights 30 are positioned at each individual station, to indicate when the telephone connection to the dispatcher is completed and also to indicate when the order has been dispatched to the customer. The telephone circuits, and energizing circuits for lights 30 are conventional, per se, and the details thereof are omitted for greater clarity and ease of illustration of the present invention.

Service doors 24 are arranged to intercept a dish or tray 43 on conveyor 14 and to transfer the dish from the conveyor belt 14 to counter 21 or table 25, as the case may be, as shown in FIG. 4. To this end, each door 24 is pivotally supported at one side on a vertical shaft 31 which is journalled in a bearing 32 mounted on a bracket 33 carried by the sidewall of base 11. A laterally extending actuating arm 34 is secured to shaft 31 adjacent the lower end thereof. A pneumatic actuator comprising a two-way piston and cylinder arrangement designated 35, of known construction per se, is mounted on each bracket 33 and has a piston end 36 carrying a clevis 37 which receives the free end of arm 34. A pin 38 formed in opposite sides of clevis 37 to thereby limit free rotation of arm 34 within clevis 37 and provides a lost motion coupling between air actuator 35 and arm 34 for purposes as will presently appear. A pair of switches 40, 41 are mounted on bracket 33 for actuating engagement by arm 34. A pair of door opening and door closing solenoids 42 and 43 are provided and operate air valves, not shown, to admit air to opposite ends of actuator 35 in a conventional manner.

In operation, a customer seated at any of the tables 25, or at any station along counter 21, picks up the adjacent telephone 29 and calls in his order to the dispatcher at the dispatch station 7. The dispatch station 7 has a conventional microphone and loudspeaker arrangement together with a console and appropriate switches therefor, not shown, enabling the dispatcher to talk to the individual customers through their telephones 29, and also enabling him to talk to others in the kitchen and work areas.

On receiving an order, the dispatcher has it filled by personnel in work area A. Thus, individual trays 43 are prepared on table 2 with selected food items from conveyors 3. When a particular order is ready, the dispatcher places it on conveyor belt 15 traveling toward the appropriate customer service group 9, and actuates an appropriate switch 50 on a console 51 at dispatch station 7, switch 50 being associated with the individual station from which the order was placed.

With main power switch 52 closed providing current to transformer 53 from a suitable A.C. source, not shown, alternating current is provided via leads 54 and 55 and light 56 indicates that the food dispensing system is thus energized. Actuation of any of the switches 50 at the dispatch station completes an energizing circuit, not shown, with the individual station light 30 to indicate that the order is on the way. Actuation of switch 50 also completes an energizing circuit with the associated door opening solenoid 42 via leads 54, 57, switch 50, leads 58, 68, a blocking diode 59, solenoid 42, lead 60, switch 40 and leads 61 and 55. Switch 40 is biased toward contact 62 but is held against contact 63 by arm 34 and piston 36 when door 24 is closed. Energization of solenoid 42 admits air under pressure from a suitable source, not shown, to actuator 35, extending piston end 36 to pivot arm 34 toward switch 41 to its broken line position in FIG. 7. Door 24 pivots with arm 34 via shaft 31 to a tray intercept position in which it extends obliquely across conveyor 14, as best seen in FIG. 4. When arm 34 pivots away from switch 40, indicating lamp 64 is lit via leads 55, 61, switch 40, contact 62, lead 65, light 30 and lead 54 and indicates to the dispatcher that the door is open. Arm 34 pivots to a position closely adjacent switch 41, corresponding to the door intercept position, but does not close normally open switch 41, since spring 66, which connects between clevis 37 and arm 34, biases arm 34 so that pin 38 abuts at the rear of slot 39 as shown by dotted lines in FIG. 7. In the door intercept position, light 64 remains lit and piston end 36 remains extended to maintain door 24 obliquely across conveyor 14 to await the arrival of a tray 43.

Conveyor 14 carries tray 43 into engagement with door 24 (FIG. 4), the latter thereupon resiliently yielding as seen in FIG. 6 and thereby cushioning the impact. Continued movement of conveyor 14 in the direction of the arrow (FIG. 4) with tray 43 engaged against interceptor door 24 pivots the latter beyond its intercept position while simultaneously moving arm 34 against the bias of spring 66 to close switch 41. Door closing solenoid 43 is thereby energized via leads 54, 57, 67, switch 41, lead 68, blocking diode 69, solenoid 43, lead 70, switch 40 (which is closed against contact 62), and leads 61 and 55 to admit air under pressure to the opposite end of actuator 35. Piston end 36 thus retracts and pivots arm 34 to its full line position in FIG. 7, whereby switch 41 is opened and switch 40 subsequently is closed through contact 63 by the engagement of arm 34 thereagainst. Door 24 follows the pivotal movement of arm 34 and moves back past its door intercept position toward its closed position, and cams tray 43 through the associated door opening 23 onto the associated counter 21 or table 25 as indicated in broken lines in FIG. 4. Light 64 is turned off and solenoid 43 is de-energized when switch 40 disengages from contact 62, and the dispensing system for that particular service opening remains at rest until again actuated by closing switch 50.

The arrangement is such that solenoids 42 and 43 need not remain energized. Also, air is relieved from one side of the piston as it is introduced against the other, in a manner well known per se.

Another embodiment of a door energizing circuit is shown in FIG. 8, such embodiment comprising an arm 34' connected, as in the previous embodiment, to shaft 31 and door 24 for pivotal movement therewith at each service position. A switch 50' and light 64' for each service position are disposed in a console 51 in dispatch area 7. At each service position, an electric motor 75 is arranged in driving relation to a cam wheel 76 having a drive bar 77 eccentrically, pivotally mounted adjacent the periphery thereof. The other end of bar 77 carries an elongated slot 78 receiving a pin 79 fixed to the free end of arm 34', which is biased by a spring 80 connecting between pin 79 and the end of bar 77, to abut the outer, left hand end of slot 78 as shown by the full lines of FIG. 8.

The dispatcher places the filled order on conveyor 15 and actuates an appropriate switch 50' on console 51 at dispatch station 7, the selected switch 50' being associated with the individual service station from which the order was placed. Actuation of any of the switches 50' completes an energizing circuit, not shown, with the individual station light 30. Switch 50' also completes an energizing circuit for the associated door opening and closing motor 75 via lead 81, switch 50' and leads 82, 83 and 84 to provide initial rotation of wheel 76, leads 81 and 84 being supplied in this instance from a direct current source, not shown. Initial rotation of wheel 76 closes switch 86, by camming roller 87 outwardly from a notch 88 on the periphery of wheel 76 so that roller 87 bears on the wheel periphery during rotation thereof, thereby completing a holding circuit for motor 75. Motor 75 remains energized and continues to rotate wheel 76 after switch 50' is released via leads 81, 89, switch 86, and leads 90, 83, and 84 to thereby draw bar 77 to the right as seen in FIG. 8 and pivot arm 34' and hence door 24 toward the tray intercept position shown in full lines in FIG. 4. As door 24 opens, arm 34' disengages from normally closed switch 91 to light lamp 64' via leads 81, 92, lamp 64', lead 93, switch 91, and leads 94 and 84. A second notch 88 is positioned on the periphery of wheel 76 on the side thereof diametrically opposite the first notch and roller 87 engages in the second notch 88 to open switch 86 and stop motor 75 when door 24 and hence arm 34' reach tray intercept position. The circuit lighting lamp 64' remains energized and arm 34' stops closely adjacent normally open switch 95, in the position shown in broken lines in FIG. 8, with door 24 extending obliquely across conveyor 14 to await the arrival of a tray 43.

When conveyor 14 carries tray 43 into engagement with door 24 the door resiliently yields and pivots beyond the door intercept position while simultaneously moving arm 34' against the bias of spring 80 to close switch 95. Motor 75 is thereby re-energized via leads 81, 89, 96, switch 95 and leads 90, 83 and 84 to again initially rotate wheel 76. Such initial rotation of wheel 76 pivots arm 34' and thereby opens switch 95 while simultaneously roller 87 cams onto the periphery of wheel 76 and closes switch 86, to re-establish that energizing circuit. Motor 75 thus continues to rotate wheel 76 after switch 95 is opened via leads 81, 89, switch 86, and leads 90, 83 and 84 to thereby pivot arm 34' and door 24 back past the tray intercept position toward the door closed position. Tray 43 is thereby cammed through the associated door opening 23 onto the associated counter 21 or table 25, as before. As wheel 76 completes a full revolution roller 87 engages in the first notch 88 to open switch 86 and thereby stop motor 75 while simultaneously arm 34' opens normally closed switch 91 to interrupt the energizing circuit for lamp 64' lit.

Thus, in both embodiments, trays 43 are moved laterally off the conveyor by the camming action of the tray against the obliquely extending intercept door and by positive displacement of the tray by closing of the intercept door. The trays are preferably generally ellipsoidal in shape, as seen in FIG. 4, to facilitate the camming action and the lateral displacement. Also, boot 28 is formed from a plastic material which provides a slippery tray engaging surface whereby the tray may slide smoothly along door 24 during the camming action and closing movement of the doors.

It is an important feature of this invention that the transfer of the trays from the continuously moving conveyor is accomplished in a smooth and easy motion without abrupt stopping or change of direction of the tray. The door 24 itself yields resiliently upon engagement by a tray to thereby lessen the impact and to smoothly retard the forward motion thereof along the conveyor with an increasing opposing force. The resilient bias of springs 66 and 80 also assists in this respect as they must both be elongated and tensioned by the engagement between the tray and door prior to actuation of the door closing air cylinder or motor as the case may be. Thus the trays are smoothly cushioned to an almost stationary position by resilient shock absorbing means before closing movement of the door displaces the trays laterally. Also, the smooth, slippery surface of boot 28 allows for gentle camming action of the ellipsoidal tray as it changes its major axis from a position parallel to the direction of movement of the conveyor to a position wherein its major axis is parallel to the obliquely disposed door. The tray slides easily against the surface of the door as it changes its direction of movement and is moved therealong by the conveyor while the door is closing. Boot 28 can be slipped upwardly off the door bar 27 for cleaning or replacement, as desired.

Accordingly, it is seen that my invention fully accomplishes its intended objects. Having thus described and illustrated two embodiments of my invention, it will be understood that such description and illustrations are by way of example only and that such modifications and changes as may suggest themselves to those skilled in the art are intended to fall within the scope of the present invention which is limited only by the appended claims.

What I claim is:

1. A food service system comprising a food dispatch area, a customer service area, a table at said service area, conveyor means for conveying dishes of food along a course from said dispatch area to said service area, and means for transferring food dishes from said conveyor means to said table including an interceptor member, fixed support means adjacent to but outside said course, said interceptor member being mounted on said fixed support means for swinging movement between a dish intercepting position and a non-intercepting position relative to said course, drive means for moving said interceptor member between said positions and including resilient damping means opposing movement of said interceptor member relative to said support means beyond said intercepting position, first drive control means adapted to be actuated from said dispatch area for moving said interceptor member into dish intercepting position, said interceptor member being movable beyond said dish intercepting position in opposition to said resilient damping means by a dish engaging thereagainst whereby gently to terminate forward motion of a dish encountering said interceptor member, and a second drive control means responsive to said latter movement for moving said interceptor member back through said intercepting position toward said non-intercepting position, said interceptor member moving the intercepted dish from said conveyor means onto said table during its movement toward said non-intercepting position.

2. A food service system according to claim 1 wherein said interceptor member is resiliently yieldable whereby gentle termination of forward movement of a dish occurs by the composite action of said resilient damping means and flexure of said interceptor member.

3. A food service system according to claim 1 including an enclosure for said conveyor means in said service area, and a service opening through said enclosure adjacent said table, said interceptor member comprising a door movable between a closed non-intercepting position across said service opening and an open intercepting position across said conveyor.

4. A food service system according to claim 3 wherein said interceptor member comprises a resiliently flexible rod extending substantially across said service opening, and a boot encasing said rod, said boot forming a substantially friction free dish engaging surface.

5. A food service system according to claim 1 wherein said interceptor member extends obliquely over said conveyor means when moved to intercepting position.

6. A food service system according to claim 5 wherein said interceptor member is at an acute angle opposing the direction of movement of said conveyor when in intercepting position, and said interceptor member is resiliently flexible in the direction of movement of said conveyor means when engaged by a dish.

7. A food service system according to claim 6 including an enclosure for said conveyor means in said service area, a service opening through said enclosure adjacent said table, said interceptor member comprising a door movable from a closed non-intercepting position across said service opening to said intercepting position across said conveyor means, said door being movable beyond said dish intercepting position upon engagement with the dish, said second drive control means moving said door through said dish intercepting position when moving said door toward said non-intercepting position.

8. A food service system comprising a food dispatch area, a customer service area, a table at said service area, conveyor means for conveying dishes of food from said dispatch area to said service area, and means for transferring food dishes from said conveyor means to said table including an interceptor member mounted for movement between a dish intercepting position and a non-intercepting position relative to said conveyor means, drive means for moving said interceptor member between said positions, first drive control means adapted to be actuated from said dispatch area for moving said interceptor member into dish intercepting position, said interceptor member being movable out of said dish intercepting position by a dish engaging thereagainst, and a second drive control means responsive to said latter movement for moving said interceptor member toward said non-intercepting position, said interceptor member moving the intercepted dish from said conveyor means onto said table during its movement toward said non-intercepting position said interceptor member extending obliquely over said conveyor means at an acute angle opposing the direction of movement of said conveyor means when moved to intercepting position, said interceptor member being resiliently flexible in the direction of said conveyor means when engaged by a dish, an enclosure for said conveyor means in said service area, a service opening through said enclosure adjacent said table, said interceptor member comprising a door movable from a closed non-intercepting position across said service opening to said intercepting position across said conveyor means, said door being movable beyond said dish intercepting position upon engagement with the dish, said second drive control means moving said door through said dish intercepting position when moving said door toward said non-intercepting position, said drive means including a motor and a lost-motion connection between said motor and said door.

References Cited
UNITED STATES PATENTS

| | | | |
|---|---|---|---|
| 3,036,692 | 5/1962 | Kiefer | 198—21 |
| 3,263,776 | 8/1966 | Kroemer | 186—1 |

EVON C. BLUNK, *Primary Examiner.*

H. C. HORNSBY, *Assistant Examiner.*